Nov. 15, 1938.   E. PALMGREN   2,136,993
DRYING APPARATUS FOR WASHING AND THE LIKE
Filed March 16, 1937   2 Sheets-Sheet 1
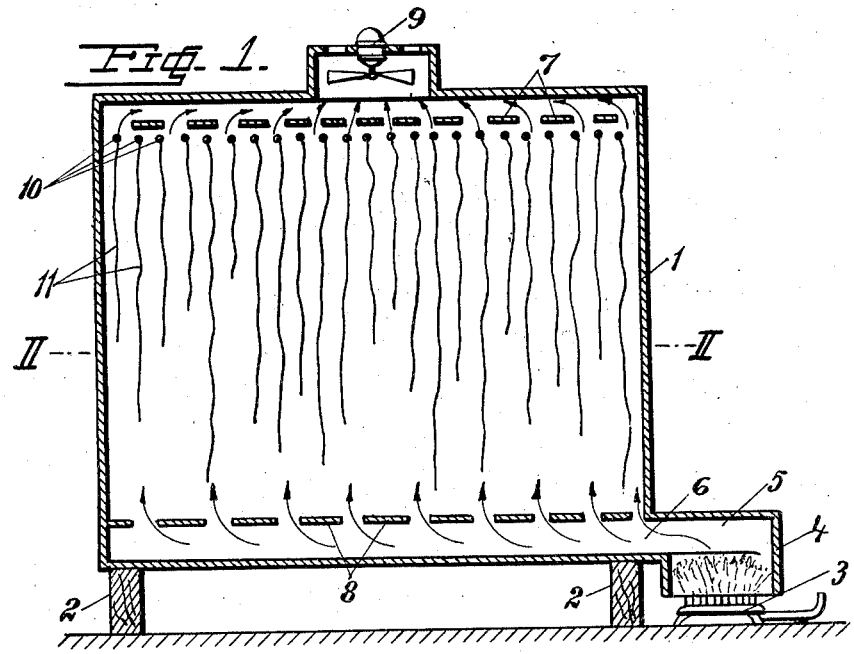
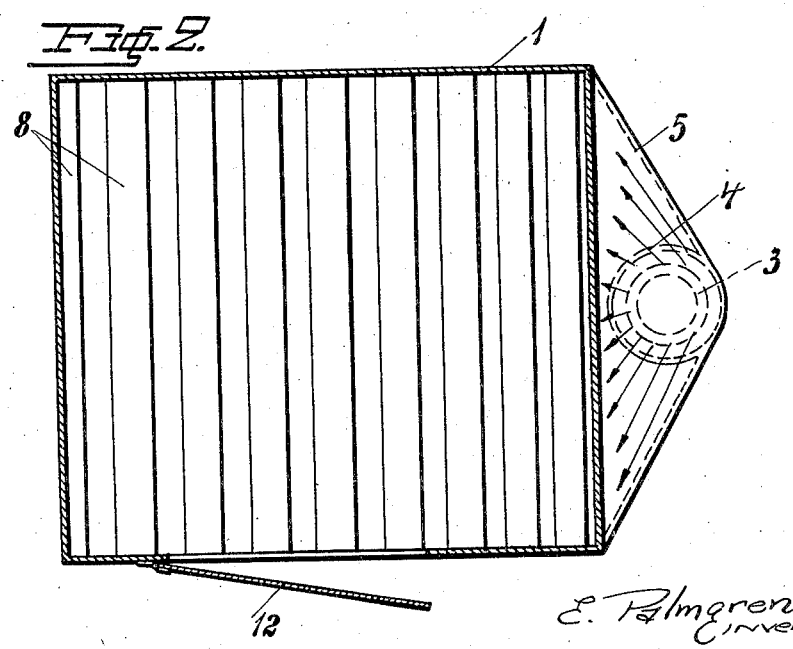

Nov. 15, 1938.　　　　E. PALMGREN　　　　2,136,993
DRYING APPARATUS FOR WASHING AND THE LIKE
Filed March 16, 1937　　　2 Sheets-Sheet 2
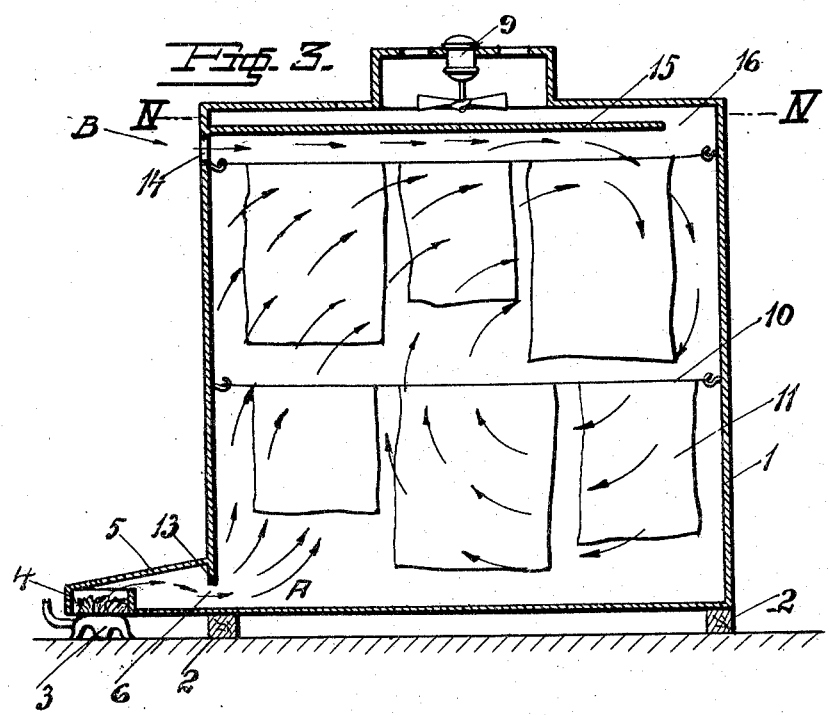
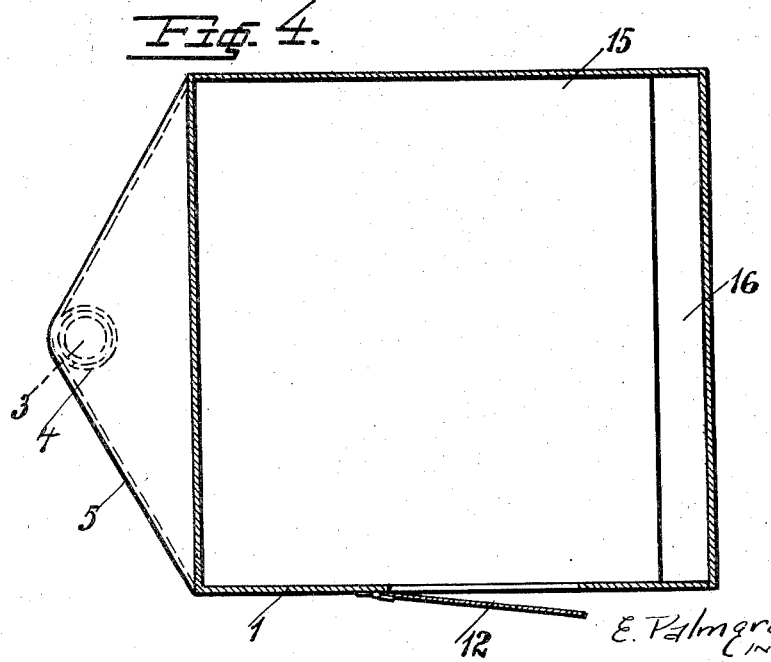

Patented Nov. 15, 1938

2,136,993

UNITED STATES PATENT OFFICE 2,136,993

DRYING APPARATUS FOR WASHING AND THE LIKE

Eric Palmgren, Saltsjobaden, Sweden

Application March 16, 1937, Serial No. 131,251
In Sweden November 13, 1934

3 Claims. (Cl. 34—19)

My invention is for improvements in and relating to drying apparatus for washing and the like. A drying apparatus according to my invention comprises a drying chamber, means for heating and introducing drying air into the drying chamber at the lower part thereof and means for discharging the moist air from the drying chamber at the upper part thereof.

The means for heating and introducing drying air into the drying chamber may comprise a gas burner or other combustion heater, arranged beside the drying chamber and connected with the lower part thereof by means of a channel, through which the combustion gases pass directly into the drying chamber. This channel preferably expands towards the drying chamber so as to form at the joining place with the drying chamber a slit-like inlet opening which extends over practically the whole width of the drying chamber.

The means for discharging the moist air from the drying chamber at the upper part thereof preferably comprises a fan or the like.

In one embodiment of my invention the drying chamber in addition is provided with a cold air intake. This intake is preferably arranged at the upper part of the drying chamber at the same side as the hot air intake, and the discharge opening for the moist air is then located at the upper part of the drying chamber opposite the cold air intake. The cold air intake may take the form of a horizontal slit-like opening arranged near the top of the drying chamber and extending over practically the whole width thereof, while above this slit is arranged a partition wall, which extends from the wall provided with the cold air intake horizontally nearly to the opposite wall so as to form with this latter a slit-like opening for the discharge of the moist air. I have found that the cold air thus introduced into the upper part of the chamber causes a circulation of the drying air in the drying chamber which substantially facilitates and accelerates the drying.

The discharge opening for the moist air preferably has the same size as the intake opening for the hot air, and all intake and discharge openings may be adjustable in respect of their size.

A drying apparatus according to my invention is simple and cheap in construction and may be used anywhere. The washing is not liable to come into contact with heated surfaces, whereby it might be damaged and the drying is effected quickly and economically.

Two embodiments of my invention are described in the following in detail with reference to the accompanying drawings, in which Fig. 1 shows one embodiment in vertical section; Fig. 2 the same embodiment in horizontal section on line II—II in Fig. 1; Fig. 3 the other embodiment in vertical section, and Fig. 4 the same embodiment in horizontal section on line IV—IV in Fig. 5.

In Figs. 1 and 2 the reference 1 denotes the drying chamber which may be square or rectangular and which rests on two supports 2. A gas burner 3 is arranged beside the drying chamber and is connected with the lower part thereof by means of a channel 4, 5, which expands towards the drying chamber so as to form at the joining place with the drying chamber a slit-like opening 6 extending over practically the whole width of the drying chamber. At the upper and lower parts the drying chamber may be provided with means for dispersing the drying air, for example lattice-work 7, 8. A fan 9 is arranged at the top of the drying chamber. The drying chamber is further provided with a door 12 or other openings for introducing and removing the washing.

When the apparatus is to be used the gas burner is lighted and the fan is started, and the combustion gases then pass directly into the drying chamber, are evenly distributed by the lower lattice-work 8 in the drying chamber, flow past the washing absorbing the moisture thereof and are discharged in even distribution from the apparatus through the upper lattice-work 7 by the fan 9.

In Figs. 3 and 4 the references 1, 2, 3, 4, 5, 6, 9, 10, 11 and 12 denote the same parts as in Figs. 1 and 2. In the inlet opening 6 is disposed a plate 13 which serves to evenly distribute the hot air over the whole width of the drying chamber.

At the upper part of the drying chamber at the same side as the hot air intake is a slit-like opening 14 for the introduction of cold air, which also extends over practically the whole width of the drying chamber. Above the cold air intake is arranged a partition wall 15, which with the opposite wall forms a slit-like opening 16 for the discharge of the moist air.

A denotes the incoming hot air and B the incoming cold air. As tests have shown and as shown in Fig. 3 the cold air first flows inwardly and then downwardly, is heated and rises to be discharged together with the hot air through the discharge opening 16.

What I claim as new and desire to secure by Letters Patent of the United States of America is:—

1. Drying apparatus for drying washing and the like, comprising a drying chamber, means for heating and introducing drying air into the drying chamber at the lower part thereof, a cold air intake at the upper part of the drying chamber at the same side as the hot air intake, a discharge opening for the moist air located at the upper part of the drying chamber opposite the cold air intake, and means for discharging the moist air from the drying chamber through the said discharge opening.

2. Drying apparatus for drying washing and the like, comprising a drying chamber, means for heating and introducing drying air into the drying chamber at the lower part thereof, a cold air intake above the hot air intake and having the form of a horizontal slit-like opening extending over substantially the whole width of the drying chamber, a partition wall arranged above the cold air intake and extending from the wall provided with the cold air intake horizontally nearly to the opposite wall so as to form with this latter a slit-like discharge opening for the discharge of the moist air, and means for discharging the moist air from the drying chamber through the said discharge opening.

3. Drying apparatus for drying washing and the like, comprising a drying chamber, a combustion heater arranged beside the drying chamber and connected with the lower part thereof by a channel which expands towards the drying chamber so as to form at the joining place with the drying chamber a horizontal slit-like opening extending over substantially the whole width of the drying chamber, a cold air intake above the hot air intake for introducing cold air directly into the drying chamber and having the form of a horizontal slit-like opening extending over substantially the whole width of the drying chamber, a partition wall arranged above the cold air intake and extending from the wall provided with the cold air intake horizontally nearly to the opposite wall so as to form with this latter a slit-like discharge opening for the discharge of the moist air, and a fan adapted to draw off the moist air through the said discharge opening.

ERIC PALMGREN.